United States Patent
Mack

[15] 3,675,151
[45] July 4, 1972

[54] SUPERRADIANT TRAVELING-WAVE DYE LASER

[72] Inventor: Michael E. Mack, Vernon, Conn.
[73] Assignee: United Aircraft Corporation, East Hartford, Conn.
[22] Filed: Sept. 25, 1970
[21] Appl. No.: 75,636

[52] U.S. Cl. .................................................. 331/94.5
[51] Int. Cl. ................................................. H01s 3/00
[58] Field of Search .................................... 331/94.5

[56] References Cited

UNITED STATES PATENTS

| | | | |
|---|---|---|---|
| 3,471,807 | 10/1969 | Kagan | 331/94.5 X |
| 3,578,849 | 5/1971 | Guillet | 331/94.5 X |
| 3,412,251 | 11/1968 | Hargrove | 331/94.5 |

OTHER PUBLICATIONS

Broida, et al., Applied Physics Letters, Vol. 16, pp. 142–144, Feb 1, 1970
Soffer, et al., Applied Physics Letters, Vol. 10, pp. 266–267, May 15, 1967
Spoeth et al., Applied Physics Letters, Vol. 9, pp. 179–181, Sept., 1, 1966.

Primary Examiner—Ronald L. Wibert
Assistant Examiner—Edward S. Bauer
Attorney—Donald F. Bradley

[57] ABSTRACT

Superradiant traveling-wave laser emission is produced with polymethine cyanine dyes pumped by mode-locked or Q-switched laser pulses without the necessity of a feedback cavity for the dye. Picosecond duration laser pulses may be produced at a variety of wavelengths by choosing the proper dye and the pumping laser wavelength.

7 Claims, 3 Drawing Figures

Patented July 4, 1972

3,675,151

INVENTOR
MICHAEL E. MACK
BY Donald J. Bradley
ATTORNEY

3,675,151

SUPERRADIANT TRAVELING-WAVE DYE LASER

BACKGROUND OF THE INVENTION

1. Field of the Invention

This invention relates to a new technique for producing laser pulses, particularly those of pico-second duration, at a variety of wavelengths. In particular, this invention relates to production of superradiant traveling-wave laser pulses by irradiating a dye laser solution with pulses from a mode-locked or Q-switched laser.

Description of the Prior Art

A number of organic dyes have been made to lase with either flashlamp or laser pumping. For example, in copending U. S. Pat. application Ser. No. 779,332 now U.S. Pat. No. 3,636,474 entitled "Ultrashort Pulses Using Laser Pumped Laser," filed Nov. 27, 1968 by A. J. DeMaria and W. H. Glenn, there is disclosed the use of a mode-locked laser to optically pump other lasers such as organic dye lasers to obtain ultrashort mode-locked pulses at other frequencies. A disadvantage of this prior technique is that the laser-pumped laser requires its own feedback cavity with mirrors that are properly spaced and have specific reflective and transmissive properties which will allow them to pass the pumping pulses and at the same time provide a feedback cavity for the laser-pumped laser. A further disadvantage of the prior technique is that the power of the pumping laser is limited by the fact that the feedback cavity mirror of the laser-pumped laser, through which the pumping pulses must pass, may be damaged at high powers.

A very high gain can easily be achieved with many of these dye solutions. Lasing has been demonstrated in solutions of as little as a millimeter of thickness with cavity mirrors having a reflectivity of only a few percent.

The present invention utilizes the high gain characteristics of dye solutions and at the same time overcomes the disadvantages of the prior art devices by producing superradiant emission in dyes without the necessity of feedback mirrors or a feedback cavity for the lasing dye. Any dye which can be lased with other pumping techniques is a candidate for the present technique when sufficient pumping can be provided. Of particular utility is the generation of ultrashort pulses of any desired wavelength by pumping a selected dye with picosecond duration pulses from a mode-locked laser. The dye inversion is then a wave traveling with a velocity equal to that for the pumping pulse, a situation analogous to that in the electrically driven traveling wave nitrogen gas laser.

SUMMARY OF THE INVENTION

In accordance with the present invention, one or a train of pulses from a mode-locked or Q-switched laser are focused on one face of an optically transparent cell which contains the desired dye solution. The sides of the cell are slightly wedge shaped to prevent them from acting as a feedback cavity. The output from the dye occurs as a train of pulses which follows generally the overall shape of the incident pumping pulse train, and by proper choice of the dye solution any wavelength longer than the pumping wavelength may be generated. A filter may be placed in the path of the output pulses to filter the pumping pulse radiation which passes through the dye solution unabsorbed. The width of the output pulses is a function of the gain of the dye solution, but for short lifetime dyes and modelocked pumping pulses the output pulses are of picosecond duration. For dyes which have absorption bands at wavelengths not matching the output wavelengths of the pumping pulses, second harmonic generators can be used to double the frequency of the pumping laser pulses. Different output wavelengths can be produced by using different dyes and different pumping sources.

DESCRIPTION OF THE PREFERRED EMBODIMENT

Superradiant traveling-wave emission may be produced from polymethine cyanine dyes and other dye laser dyes pumped by pulses from a mode-locked or Q-switched laser. Results obtained by pumping polymethine cyanine dyes with pulses from a mode-locked ruby laser will be described, but the technique is applicable to any fluorescent laser dye which exhibits absorption by properly matching the wavelength of the laser pulse radiation with the energy level of the dye, and by adjusting the power of the laser pulse radiation. The system disclosed offers greater simplicity and ease than the prior art mode-locking techniques for generating short dye laser pulses which require a separate feedback cavity for the dye.

Figure 1:
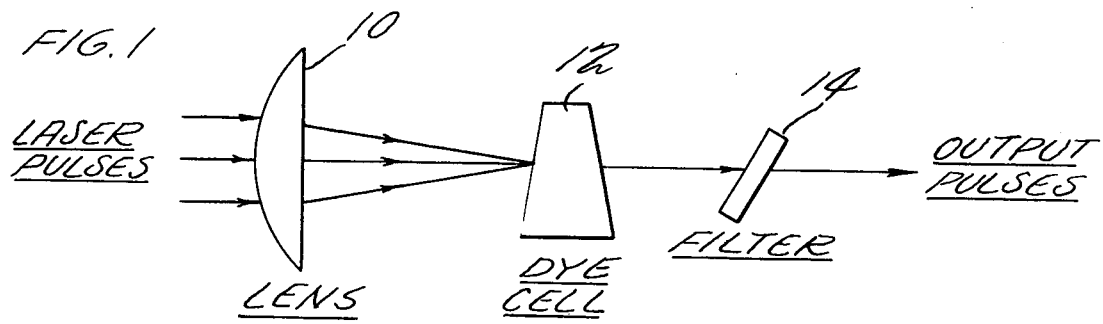
FIG. 1 shows in schematic form the preferred embodiment of the invention.

Referring to FIG. 1 there is shown the preferred embodiment for generating traveling-wave dye laser emission. A train of pulses from a mode-locked ruby laser are focused by a lens 10 upon a cell 12 which contains the dye solution. The laser pulses had a duration of from 2 to 5 psec and a peak power of up to about 5 GW. A beam divergence of 1 mrad is typical for the laser. The cell 12 containing the dye was 2 cm. thick and wedged so that the windows made an angle of about 10°, but this angle is not critical and serves merely to prevent the walls of the cell from acting as a feedback cavity. The length of the cell was chosen to be long enough that stimulated emission could be achieved with a moderate dye concentration, yet short enough that stimulated Raman scattering in the dye solvent, methanol, would be negligible. Other cell lengths may be used. Filter 14 was positioned in the path of the dye cell emission to separate the dye emission from the ruby pump light.

A superradiant traveling-wave emission was produced for three dyes: cryptocyanine, DDI (1, 1'-diethyl-2, 2'-dicarbocyanine iodide), and DTTC (3, 3'-diethylthiatricarbocyanine iodide), each of which was dissolved in methanol. The results for DTTC are representative. With this dye the emission occurs in a 130–180 A wide band, centered at 7,920–8,080 A, depending on the dye concentration. Maximum output occurs with a concentration giving a band center at 7,980 A. At this concentration, the low-level transmission at 6,943 A through the 2-cm. cell 12 corresponds to an optical density of 6.0. More than 90 percent of the incident pump light was absorbed.

Figure 2:
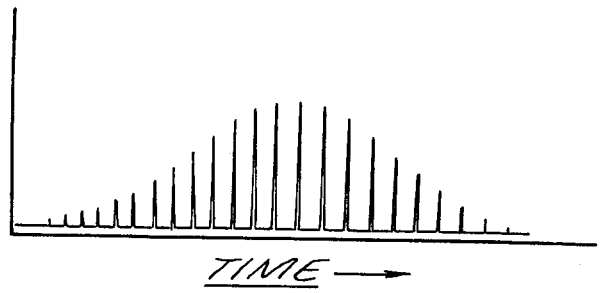
FIG. 2 shows the output pulses produced from the dye cell.

The output from the dye occurs as a train of pulses shown in FIG. 2 which follows more or less the overall shape of the incident pump pulse train. The emission takes place in a narrow beam with an angular divergence of about 15 mrad. As in the case of pumping with a Q-switched laser, the direction of polarization of the output beam is the same as that in the pump beam. With 1 J of pump energy, the total energy emitted in the forward direction is generally from 10 to 30 mJ. The forward-to-backward emission ratio is about 100:1.

The output pulse width can be inferred from the high forward-to-backward emission ratio which indicates that the fluorescence decay time and, therefore, the pulse duration, must be less than the 90-psec transit time through the cell. One indication of how much less is given by the fact that if the entrance window of the dye cell 12 is sufficiently thin an emission occurs not only in the forward direction, but also in the direction normal to the outside face of this window. This emission arises due to the amplification of fluorescence radiation generated near the window. The radiation travels through the window and is reflected back at the glass-to-air interface. This indicates an appreciable decay of gain, in a time equal to the difference in the round trip transit times for the two windows. That is to say, the pulse duration must be on the order of 15 psec or less.

In the frame of reference moving with the emitted pulses, the growth of the energy density W per unit frequency interval per unit solid angle follows the relation $$\frac{d}{dt} W(z, t) - hvS(v)\bar{B}\Delta N(z, t) = hvS(v)\bar{A}N_2(z, t) \quad (1)$$

where $S(\nu)$ is the lineshape function, $\overline{A}$ and $\overline{B}$ are Einstein A and B coefficients per unit solid angle for given polarization, and $N_2$ and $\Delta N$ are the excited-state population and inversion in the dye, respectively. Saturation effects are ignored in Eq. (1). In general, $N_2$ and $\Delta N$ are functions both of position $z$ in the moving frame and of time $t$. However, if the difference in group velocities of the emitted dye laser pulse and the incident pump pulse is ignored, $N_2$ and $\Delta N$ are not explicitly dependent on time and Eg. (1) can be readily integrated.

Figure 3:
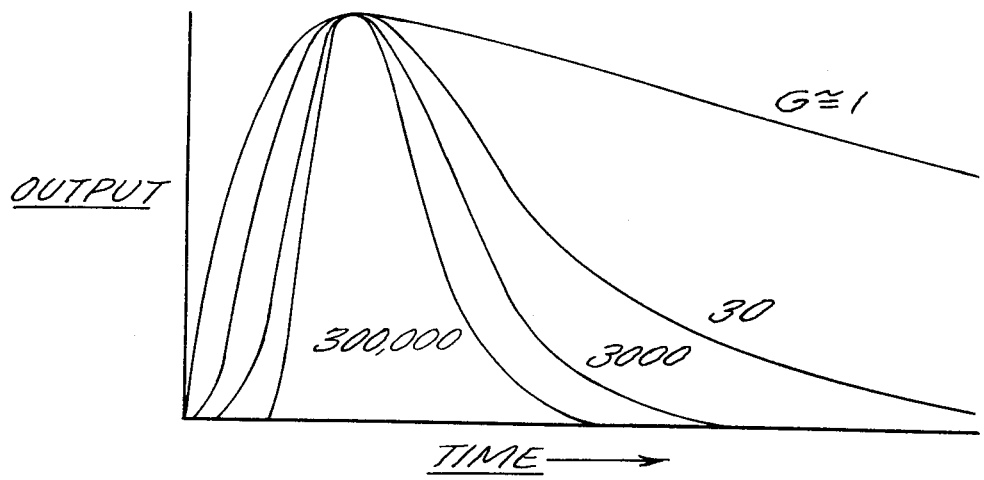
FIG. 3 shows a graph of the output pulse duration as a function of peak traveling-wave gain.

The results are shown in FIG. 3 for an excited-state population of the form $$N_2(t_0) = N(e^{-t_0/T_f} - e^{-t_0/T_r}). \quad (2)$$

Here the position $z$ has been replaced by $t_0 = z/v$, where $v$ is the common group velocity. For the polymethine cyanine dyes, a fluoresence decay time of $T_f = 50$ psec would seem to be reasonable estimate. The population risetime would be the longer of the pump pulse duration or the Franck-Condon time for the dye. A value of $T_r = 2$ psec, corresponding roughly to the pump pulse duration, was chosen.

From FIG. 3, it can be seen that a fairly modest gain will initially give a substantial pulse sharpening. However, once the dye laser pulse duration becomes comparable to the pumping pulse duration, or more accurately, to the inversion risetime, a considerable increase in gain is required to achieve even a slight decrease in pulse duration. If the dye-laser emission builds up to the point that the gain saturates, then there may be an additional pulse sharpening due to the nonlinear amplification.

If the pulse from the mode-locked laser is longer than the dye cell length, an output is generated from the dye cell in both the forward and backward directions.

Q-switched laser pulses may be used in place of mode-locked pulses in many applications. It is the total power density fed to the dye which is the critical parameter, since this determines the gain achieved.

Although this technique has been demonstrated only for a single class of dyes, the polymethine cyanines, all emitting in the infrared region of the spectrum, visible-region emission will be produced in other classes of dyes by pumping with the second harmonic of a laser such as a mode-locked ruby or neodymium laser. However, the longer lifetimes of most of the other common laser dyes would necessitate a very high gain or possibly strong saturation in order to obtain picosecond pulse durations. Solid dye solutions such as Rhodamine 6G in polymethyl methacrylate may also be used, in which case a dye cell is unnecessary.

I claim:

1. Apparatus for generating superradiant traveling-wave laser pulses of picosecond duration comprising:

means for generating a train of mode-locked picosecond duration laser pulses, a cell having opposite walls which are nonparallel and which are optically transparent, a lasing organic dye solution optically absorbing at the wavelength of said mode-locked laser pulses being contained within said cell, means for focussing said mode-locked laser pulses on said dye solution within said cell in a direction which intersects said nonparallel walls and at an intensity sufficient to produce an inversion in said dye solution and to produce super-fluorescent emission therefrom in the form of a plurality of picosecond duration output pulses traveling at a velocity equal to that of said mode-locked pulses, and filter means positioned in the path of said output pulses to filter the mode-locked laser pulses which pass through said dye solution unabsorbed.

2. Apparatus as in claim 1 in which said lasing dye solution is a solid solution.

3. Apparatus as in claim 1 in which said means for focussing said laser pulse is a lens.

4. Apparatus as in claim 1 in which said dye solution contains a polymethine cyanine dye.

5. Apparatus as in claim 4 in which said dye is cryptocyanine.

6. Apparatus as in claim 4 in which said dye is DDI.

7. Apparatus as in claim 4 in which said dye is DTTC.

* * * * *